United States Patent [19]
Kondo et al.

[11] 4,278,325
[45] Jul. 14, 1981

[54] ELECTRONIC TIMEPIECE

[75] Inventors: Kenichi Kondo; Ryuichi Kuronuma; Noboru Kaneko, all of Tokyo, Japan

[73] Assignee: Kabushiki Kaisha Daini Seikosha, Tokyo, Japan

[21] Appl. No.: 967,980

[22] Filed: Dec. 11, 1978

[30] Foreign Application Priority Data

Dec. 12, 1977 [JP] Japan ................................ 52/149495

[51] Int. Cl.³ ............................................. G02F 1/133
[52] U.S. Cl. ................................. 350/331 T; 340/765; 368/84; 368/242
[58] Field of Search ..................... 350/331 T; 340/765; 368/84, 242

[56] References Cited

U.S. PATENT DOCUMENTS

| | | | |
|---|---|---|---|
| 3,705,310 | 12/1972 | Wild | 350/336 X |
| 3,921,162 | 11/1975 | Fukar et al. | 350/331 T X |
| 4,057,325 | 11/1977 | Kondo | 350/331 T X |
| 4,128,311 | 12/1978 | Smith et al. | 350/336 X |

*Primary Examiner*—Edward S. Bauer
*Attorney, Agent, or Firm*—Robert E. Burns; Emmanuel J. Lobato; Bruce L. Adams

[57] ABSTRACT

In an electronic timepiece having a liquid crystal display and a dynamic driving circuit for producing a display driving signal having an effective driving voltage, the dynamic driving circuit is provided with a device for detecting the capacitance of the liquid crystal to sense a change in ambient temperature. The effective driving voltage of the display driving signal is adjusted in response to changes in the detecting capacitance and thereby the ambient temperature to compensate for the changes. In this way, the "on" voltage of the display is maintained above the saturation voltage and the "off" voltage of the display is maintained below the threshold voltage thereof over a wide temperature range so as to eliminate cross talk.

3 Claims, 13 Drawing Figures

ELECTRONIC TIMEPIECE

BACKGROUND OF THE INVENTION

This invention relates to a temperature compensation system for a matrix type liquid crystal display which has a liquid crystal layer in the cross points between the longitudinal drive electrodes and the lateral drive electrodes.

Nowadays, a liquid crystal display is used broadly as the display for an electronic timepiece.

It is used generally since it has a low current consumption, a low voltage and has a long lifetime with a small sized battery.

There is a static driving system for a liquid crystal and a dynamic driving system for the above mentioned liquid crystal display.

In the operation of the static driving system, the operating temperature range of the display is broad, namely about 0° C. to 50° C. at which the display operates with stability so that it obtains a practical and sufficient display effect.

However, the dynamic driving system using a time sharing method is adopted instead of the static driving system since the circuit construction in the static driving system is complicated and has a big size because of the increase of display information and of the variety of display characters.

It is disadvantageous that the dynamic driving system is narrower than the static driving system in the operating temperature range, since it generates the cross-talk phenomenon at 40° C. it exhibits a poor display at the non-selecting portion, it has a poor contrast at below 10° C., and it generates a incomplete display when there is a delay in the response time.

FIG. 1 shows the characteristic-variation of the effective voltage with respect to the temperature of the conventional dynamic driving system. Von is the effective voltage applied to the selecting segment and Voff is the effective voltage applied to the non-selecting segment.

In FIG. 1. cross-talk is produced at about 35° C. because Voff is greater than $V_{th}$, which is the threshold voltage of the liquid crystal.

On the other hand, incompleteness of contrast is initiated at a low temperature of about 15° C. because Von is greater than Vsat which is the saturation voltage of the liquid crystal.

Conventionally, there is the change-over system which changes the frequency of the driving pulse applied to a liquid crystal and the voltage thereof corresponding to signals which are generated by a thermistor which detects the ambient temperature-variation of the display, in order to compensate for the temperature-variation.

However, it is disadvantageous that this control system does not control the change of the electro-light characteristic depending upon aging changes and is subjected to limitations in the cost and design as a result of the addition of the element such as a thermistor in a limited space such as an electronic watch space.

SUMMARY OF THE INVENTION

It is, therefore, the main object of the present invention to provide a liquid crystal display capable of enlarging the operating temperature range in the dynamic driving system of the liquid crystal in order to eliminate the above-mentioned defects.

It is another object of the present invention to provide a liquid crystal display using the temperature characteristics of the liquid crystal as the temperature detecting element.

These and further objects, features and advantages of the invention will become more apparent when read the following detailed description of the invention by reference to the accompanying drawings illustrative by way of several preferred embodiments of the invention.

DETAILED DESCRIPTION OF THE INVENTION

Figure 1:
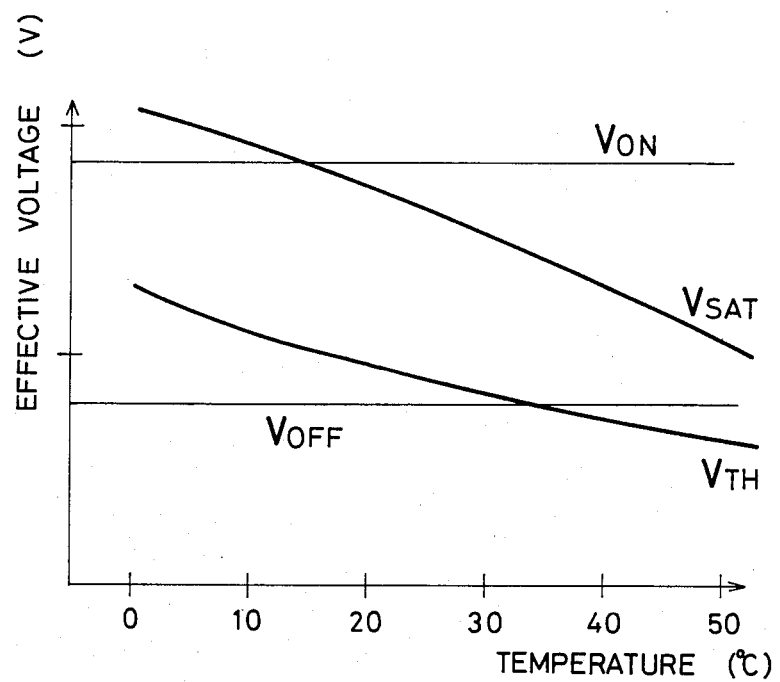
FIG. 1 is a graph of the temperature characteristic of a multiplexed driving system for a liquid crystal.
Figure 2:
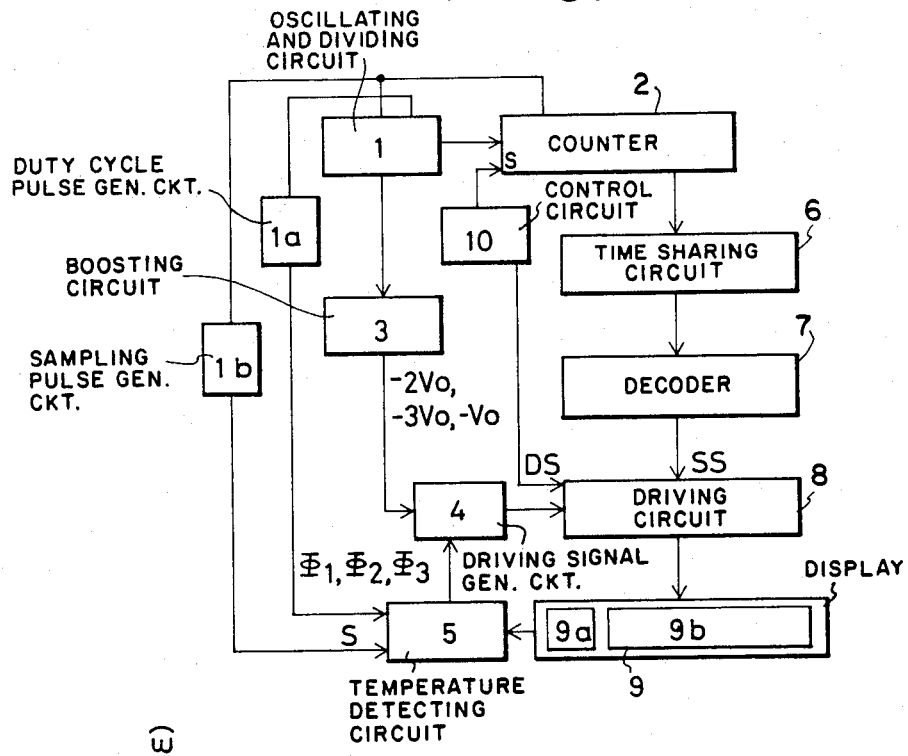
FIG. 2 is a block diagram showing a construction of the invention used for an electronic wrist watch.

FIG. 2 shows an electronic timepiece construction in the case where this invention is applied to an electronic timepiece.

The reference numeral 1 is an oscillating and dividing circuit, the reference numeral 2 is a counter which consists of second counter 2a, minute counter 2b and hour counter 2c (see FIG. 4b), the reference numeral 3 is a boosting circuit which generates the voltages of −2 Vo, −3 Vo, and −Vo, the reference numeral 4 is a driving signal generating circuit, the reference numeral 5 is a temperature detecting circuit, the reference numeral 6 is a time sharing circuit, the reference numeral 7 is a decoder, the reference numeral 8 is a driving circuit, the reference numeral 9 is a liquid crystal display which includes electrode 9a for detecting the temperature and electrode 9b for displaying time and the reference numeral 10 is a control circuit.

The control circuit generates the control signal for providing the set-signal for the counter 2 and selecting the digit to adjust time, when the time correction is made by the operation of a switch.

Some of signals derived from the oscillating and dividing circuit 1 are counted by the counter 2 and some of signals are provided to a duty cycle pulse generating circuit 1a and a sampling generated by circuit 1b.

The BCD signal (binary code decimal) derived from the counter 2 is provided to the decoder 7 selectively by the time sharing circuit 6. The segment signal of the decoder 7 is applied to the driving circuit 8.

The driving circuit 8 applies the driving signal to the liquid crystal display 9 whereby it displays.

The boosting circuit 3 steps up the battery voltage by using the divided signal. The driving signal generating circuit 4 generates the driving signal which is applied to the driving circuit 8.

The temperature detecting circuit 5 detects the temperature by using the temperature-characteristic of the display and makes the driving signal generating circuit 4 operate so as to change the waveform of the driving signal in response to the change of temperature characteristic of the liquid crystal.

Figure 3:
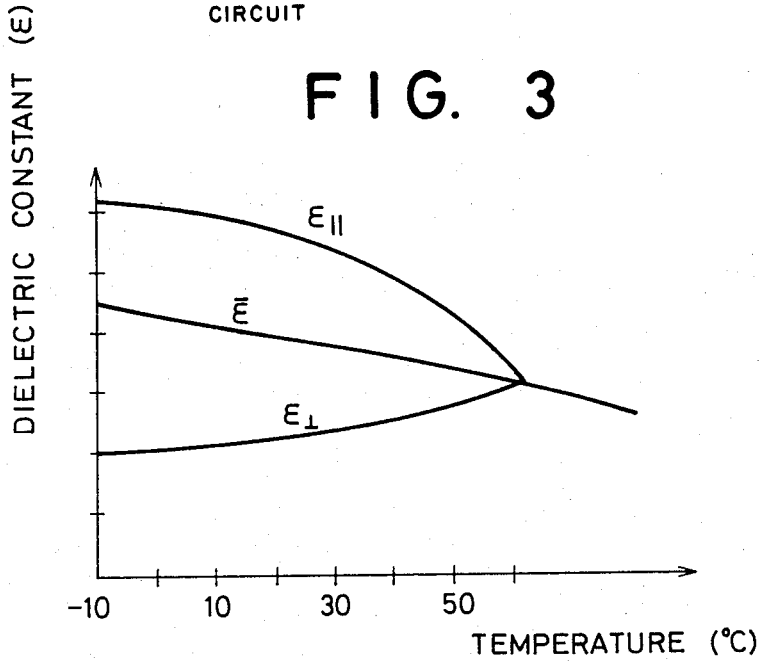
FIG. 3 is a graph of the temperature characteristic of the dielectric constant of a liquid crystal.

FIG. 3 shows the relationship between the temperature and the dielectric constant $\epsilon$ of the liquid crystal.

The liquid crystal is represented equivalently by a static capacitance and resistance.

The detection of the temperature may be made by the detection of the variation of the static capacitance, since the static capacitance is in proportion to the dielectric constant.

Figure 4A:
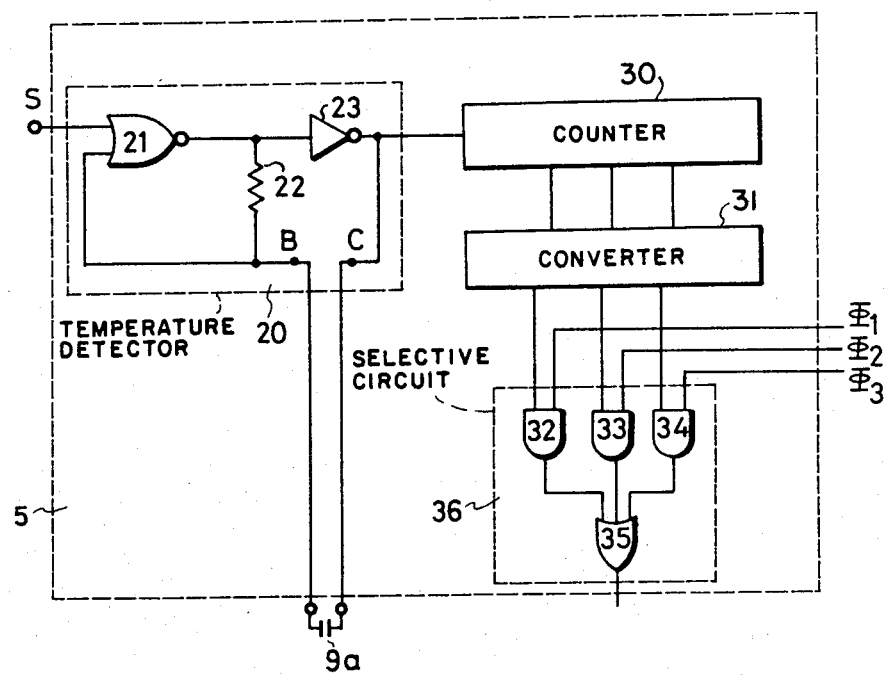
FIG. 4a is a circuit diagram of the temperature detecting circuit in accordance with this invention.

FIG. 4a shows the embodiment of the temperature detecting circuit 5 which consists of the temperature detecting section 20, the counter section 30, converter section 31, and the selection section 36.

The temperature detecting section 20 comprises the astable multivibrator in which the state capacitance is the static capacitance of the liquid crystal display 9. And the static capacitance is detected by the detecting electrode 9a.

The signal of the oscillating frequency determined by the product of resistance value of the resistor 22 and capacitance is generated from the inverter 23 when the sampling signal "S" is applied to the NOR circuit 21. The counter 30 counts the oscillating frequency per unit time.

Namely, the content of the counter 30 becomes great, when the capacitance becomes small in the high temperature range whereas the content of the counter 30 becomes small in the low temperature range.

The converter section 31 reads the BCD signal and discriminates between the high temperature region, the intermediate temperature region and the low temperature region.

When the liquid crystal is one of the predetermined temperature regions, one of the three output terminals of 31 associated therewith goes to the high logical level "1".

The selective circuit section 36 comprises the AND circuits 32-34 and the OR circuit 35 and selects one of $\Phi_1$-$\Phi_3$ each of which has different duty cycle ratios. Thus, one of $\Phi_1$-$\Phi_3$ is generated from the OR circuit 35.

Figure 4B:
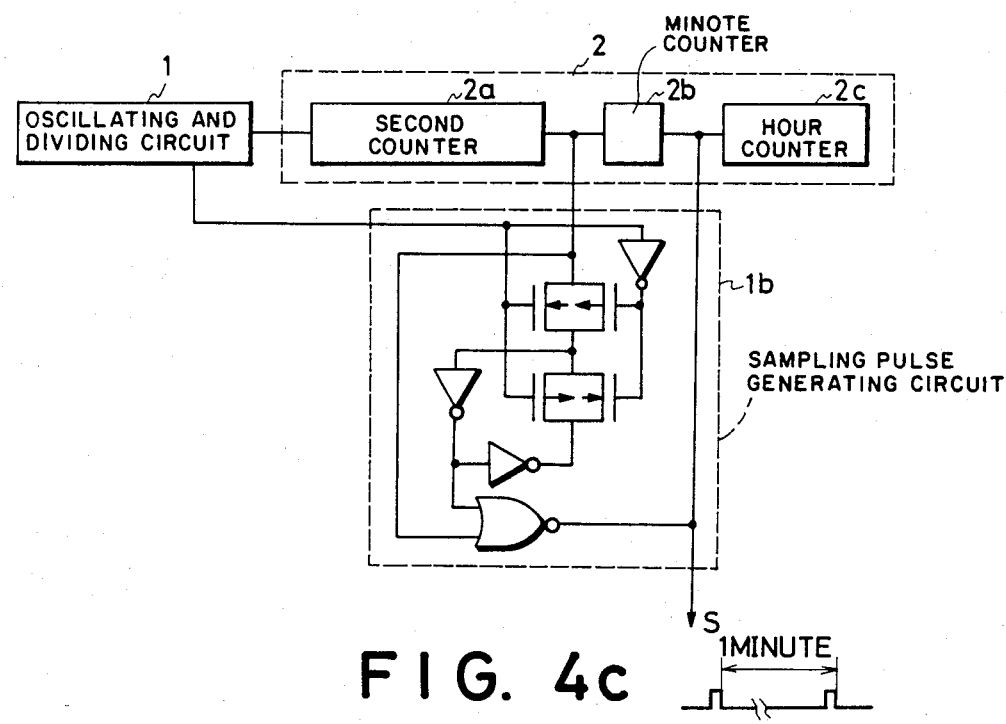
FIG. 4b shows a sampling pulse generating circuit.

FIG. 4b shows a sampling pulse generating circuit 1b which receives the pulse signal of the second counter 2a and the minute counter 2b of the counter 2.

Accordingly, the sampling pulse S is produced once every minute.

Figure 4C:
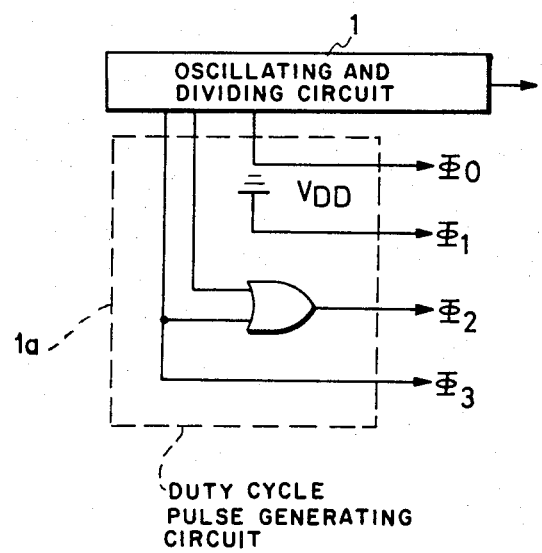
FIG. 4c shows a duty cycle pulse generating circuit.

FIG. 4c shows a duty cycle pulse generating circuit 1d which receives the signals of the oscillating and dividing circuit 1 and which produces the signals $\Phi_1$, $\Phi_2$, and $\Phi_3$ which have different duty cycle ratios.

Figure 4D:
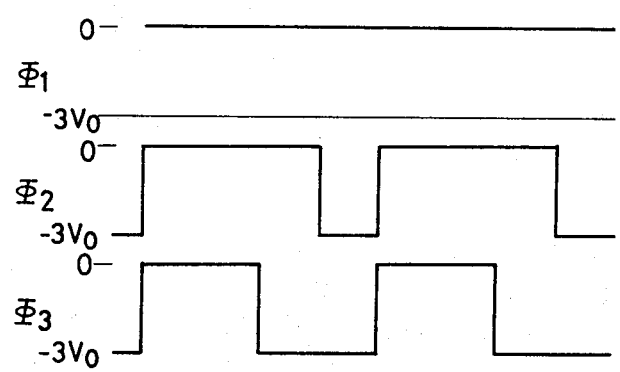
FIG. 4d shows the waveforms of pulses $\Phi_1$, $\Phi_2$ and $\Phi_3$ from the duty cycle pulse generating circuit.

As shown in FIG. 4d, $\Phi_1$ has a 100% duty cycle ratio, $\Phi_2$ has a 75% duty cycle ratio and $\Phi_3$ has a 50% duty cycle ratio.

Figure 5A:
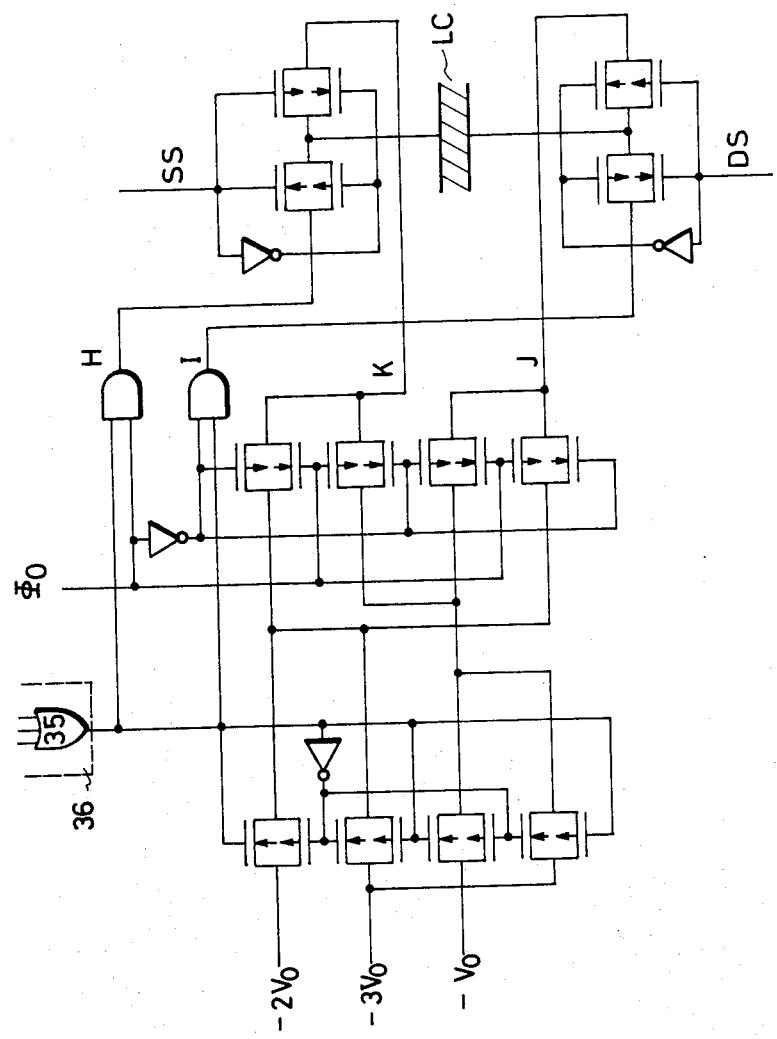
FIG. 5a is an embodiment of the driving circuit shown in FIG. 1.

FIG. 5a is an embodiment of the driving circuit 8, which produces the liquid crystal LC drive for display 9.

Namely, this liquid crystal LC is operated by the signal SS for the segment electrode and the signal DS for the digit electrode.

Figure 5B:
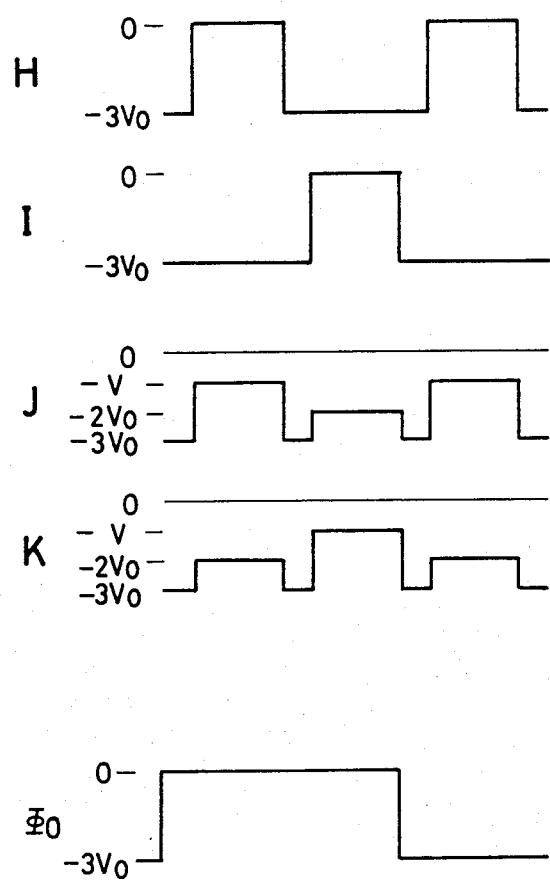
FIG. 5b shows the waveform of the signals in the driving circuit shown in FIG. 5a, FIG. 5c is a time-chart showing the waveforms of the driving voltages at respective temperatures in accordance with this invention.

In FIG. 5b, the waveforms of the signals H, I, J, K and $\Phi_0$ of the driving circuit are shown.

Figure 5C:
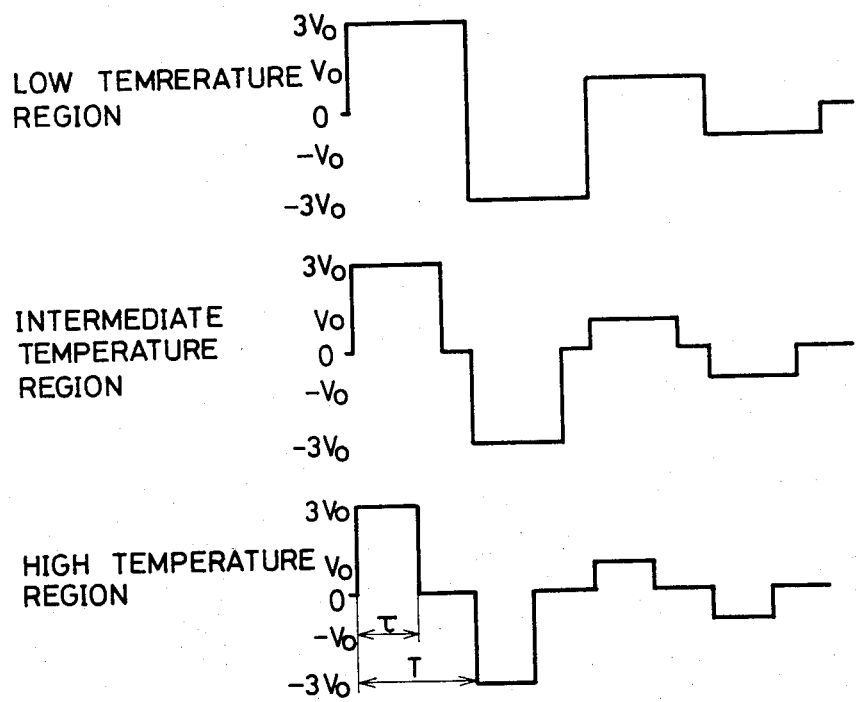

FIG. 5c shows the waveforms applied to LC at selective time points.

The driving waveform of low temperature region is different from the driving waveform of intermediate temperature region.

The effective driving voltage of low temperature region is higher than that of intermediate temperature region.

Also, the driving waveform of high temperature region is different from the driving waveform of intermediate temperature region.

The effective driving voltage of the high temperature region is lower than that of intermediate temperature region.

Namely, the temperature produced is compensated by the effective voltage change which is attained by varying the driving time ratio $\tau/T$ shown in FIG. 5c since the electric-light characteristic of the liquid crystal depends upon the effective voltage.

Figure 6:
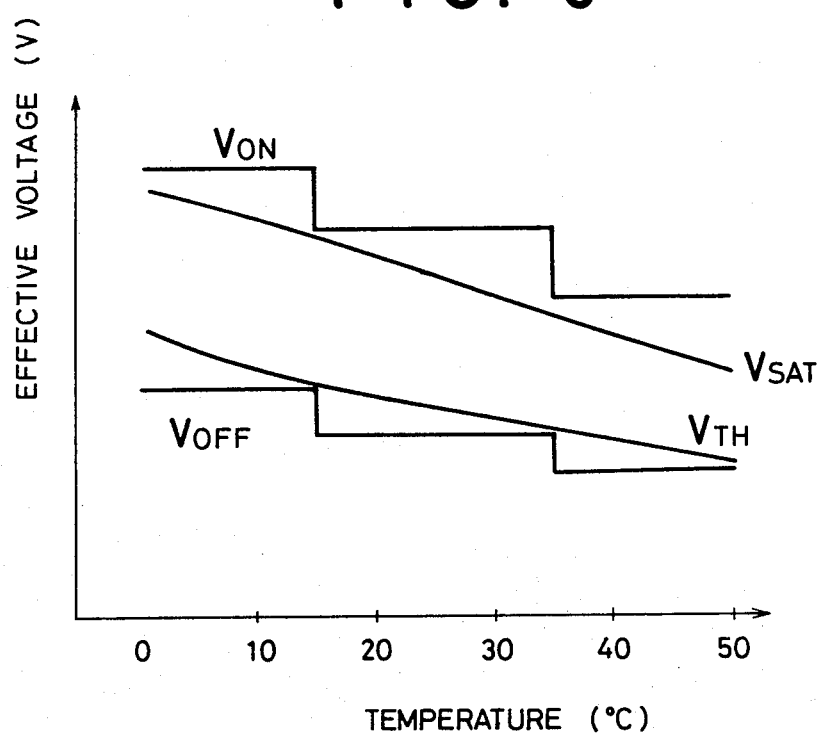
FIG. 6 is a graph of the effective voltage applied to the liquid crystal with respect to the temperature.

FIG. 6 shows the temperature compensation of the multiplex driving system for the liquid crystal display.

The liquid crystal is selected so that the effective voltage VON is over the saturation voltage Vsat at the low temperature region. The cross-talk phenomenon is prevented even in the high temperature region by changing the driving time ratio $\tau/T$ so as to be small gradually according to the increase of the temperature.

From the above procedure, the liquid crystal display may obtain the broad operating temperature range.

When the temperature is detected, the sampling signal S of FIG. 4a is applied to the temperature detecting section as mentioned above. However, the sampling signal does not always need to be generated, namely it has to be genererated at the particular time.

For example, the segment electrodes detect the temperature when the minute display is at one minute or five minutes.

Figure 7A:
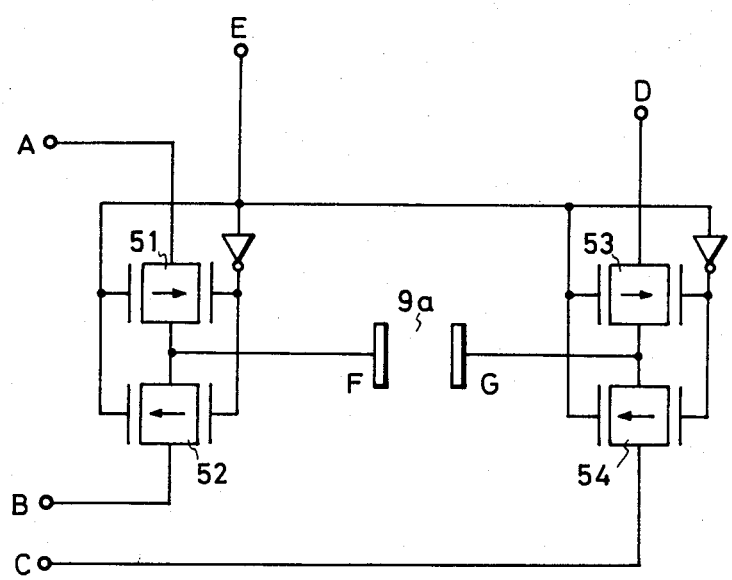
FIG. 7a shows a switching circuit having the temperature terminal in accordance with this invention and, FIG. 7b shows a top plan view of the electronic timepiece used in this invention.

FIG. 7a shows the switching circuit having the temperature detecting terminal. The electrode F of the liquid crystal display depicts the segment electrode and the electrode G depicts the digit electrode.

In the normal state, the switching circuits 51 and 53 are maintained to be in the ON state since the terminal E receives a signal at the logical level "0".

Accordingly, the display operates normally.

Next, the switching circuits 51 and 53 go into the OFF state and the switching circuits 52 and 54 go into the ON state, when the terminal E receives the sampling signal S for detecting the temperature at a particular time, for example, at one minute or five minutes. Accordingly, the terminals B and C are connected to the temperature detecting section 20 as shown in FIG. 4a whereby the temperature may be detected. It is desired that this sampling signal has a pulse width below 500 ms, in considering the response characteristic of the liquid crystal.

Figure 7B:
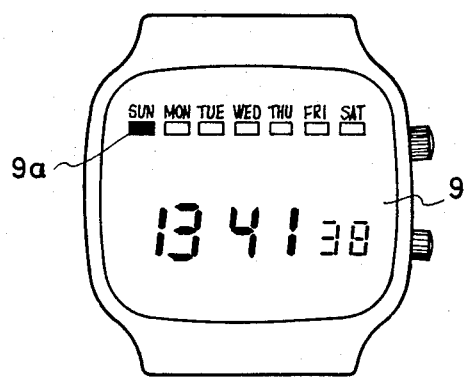

FIG. 7b shows a top plan view of an electronic timepiece. The electrodes F and G of the liquid crystal as shown in FIG. 7a are used as the display electrode 9a for the day of the week, with Sunday shown as being indicated.

As mentioned above, in accordance with this invention, an additional temperature sensor is not needed since the compensation of the temperature is made in the display by using a display segment electrode which detects the capacitance variation of the liquid crystal derived from the temperature.

Accordingly, a small sized, thin and multi-functional electric timepiece is provided in accordance with this invention. Additionally, it is also advantageous that an electronic timepiece in accordance with this invention is precise and has reasonable construction, since it uses the characteristic of the liquid crystal directly without affecting the performance of the temperature sensor and its lifetime. Further, although we obtain a liquid crystal display which varies the effective voltage for applying to the liquid crystal corresponding to temperature-variation, the change of the effective voltage is realized by the amplitude change of the voltage for driving the liquid crystal, or a frequency-change of the driving signal.

What is claimed is:

1. In an electronic timepiece having a liquid crystal display including liquid crystal display electrodes and a dynamic driving circuit for producing a display driving signal having an effective driving voltage to drive the liquid crystal display electrodes to display time information, the improvement wherein the dynamic driving circuit comprises means for producing a periodic sampling signal defining a periodic sampling period, means including at least some of said liquid crystal display electrodes used to display time information for detecting the capacitance of the liquid crystal in response to the periodic sampling signal to sense a change in ambient temperature only during the sampling periods, and means for adjusting the effective driving voltage of the display driving signal in response to changes in the detected capacitance corresponding to changes in the ambient temperature to thereby compensate for temperature changes.

2. The electronic timepiece according to claim 1; wherein the dynamic driving circuit includes means for producing display driving signal pulses and the adjusting means comprises means for changing the duty cycle of the display driving signal pulses to change the effective driving voltage thereof.

3. The electronic timepiece according to claim 2; wherein the means for changing the duty cycle includes means for producing a plurality of different duty cycle pulse signals, and means for applying a selected one of the plurality of different duty cycle signals to the display in response to the magnitude of the detected capacitance.

* * * * *